(12) United States Patent
Lee et al.

(10) Patent No.: US 8,731,055 B2
(45) Date of Patent: May 20, 2014

(54) METHOD AND APPARATUS FOR ENCODING AND DECODING AN IMAGE BASED ON PLURALITY OF REFERENCE PICTURES

(75) Inventors: Sang-rae Lee, Suwon-si (KR); Woo-jin Han, Suwon-si (KR); Jung-hye Min, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 914 days.

(21) Appl. No.: 12/395,977

(22) Filed: Mar. 2, 2009

(65) Prior Publication Data

US 2009/0279606 A1 Nov. 12, 2009

(30) Foreign Application Priority Data

May 8, 2008 (KR) .................. 10-2008-0042866

(51) Int. Cl.
*H04N 7/12* (2006.01)
*H04N 11/02* (2006.01)
*H04N 7/26* (2006.01)

(52) U.S. Cl.
CPC ..... *H04N 7/26037* (2013.01); *H04N 19/00036* (2013.01)
USPC .................. 375/240.12; 375/240.16

(58) Field of Classification Search
CPC ............. H04N 7/26037; H04N 19/00036
USPC .............................. 375/240.01–29
See application file for complete search history.

(56) References Cited

U.S. PATENT DOCUMENTS

| 7,016,544 B2 | 3/2006 | Boon |
| 2002/0015513 A1 | 2/2002 | Ando et al. |
| 2002/0118758 A1 | 8/2002 | Sekiguchi et al. |

OTHER PUBLICATIONS

Thomas Wiegand, Member, IEEE, Eckehard Steinbach, and Bernd Girod, Fellow, IEEE, "Affine Multipicture Motion-Compensated Prediction", IEEE Transactions on Circuits and Systems for Video Technology, vol. 15, No. 2, Feb. 2005.*

* cited by examiner

*Primary Examiner* — Sath V Perungavoor
*Assistant Examiner* — Xiaolan Xu
(74) *Attorney, Agent, or Firm* — Sughrue Mion, PLLC

(57) ABSTRACT

A method and apparatus for encoding and decoding an image using a plurality of reference pictures. In an exemplary embodiment, the method of encoding an image comprises: generating information about transforms between a first picture and a second picture; generating a reference picture by transforming the second picture based on the generated information about transforms; predicting a current block of a current picture based on at least one of the reference picture and the first picture; and encoding the current block based on the predicting. Therefore, prediction encoding based on more accurate prediction is possible, thereby increasing a compression ratio of image encoding.

18 Claims, 4 Drawing Sheets

METHOD AND APPARATUS FOR ENCODING AND DECODING AN IMAGE BASED ON PLURALITY OF REFERENCE PICTURES

CROSS-REFERENCE TO RELATED PATENT APPLICATION

This application claims priority from Korean Patent Application No. 10-2008-0042866, filed on May 8, 2008, in the Korean Intellectual Property Office, the disclosure of which is incorporated herein in its entirety by reference.

BACKGROUND OF THE INVENTION

1. Field of the Invention

Methods and apparatuses consistent with the present invention relate to encoding and decoding an image, and more particularly, to a method and apparatus for encoding and decoding an image by performing inter prediction using a plurality of reference pictures that are most similar to a current picture.

2. Description of the Related Art

In image compression methods such as Moving Picture Experts Group-1 (MPEG-1), MPEG-2, MPEG-4, and H.264/MPEG-4 Advanced Video Coding (AVC), a picture is divided into a predetermined image processing unit, for example, a block having a predetermined size. Then, each of the blocks is encoded using inter prediction or intra prediction. An optimum encoding mode is selected in consideration of a data size and a data distortion of the blocks, and the blocks are encoded according to the selected optimum encoding mode.

Here, inter prediction compresses an image after eliminating temporal redundancy between pictures. An example of inter prediction includes motion prediction encoding, which uses at least one reference picture to predict motion of a current picture to obtain a block unit, and predicts each block based on the result of motion prediction.

In order to predict the current block, in motion prediction encoding, a block that is most similar to the current block is searched for in a determined searching range of the reference picture. When the similar block is found, only residual data existing between the current block and the block that is similar to the current block in the reference picture is encoded and transmitted, thereby increasing a compression rate of data. This will be described in more detail with reference to FIG. 1.

Figure 1:
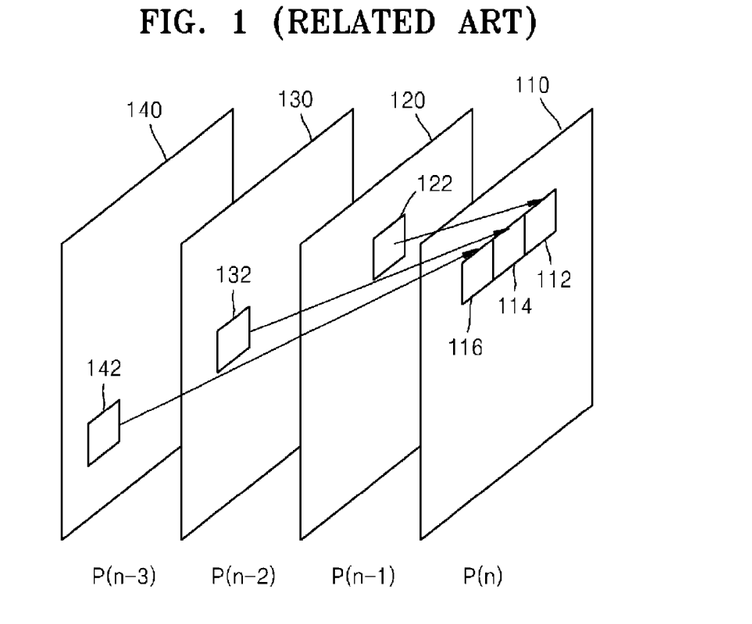
FIG. 1 illustrates a conventional method of predicting blocks of a current picture using a plurality of reference pictures.

FIG. 1 illustrates a conventional method of predicting blocks 112, 114, and 116 of a current picture 110 using a plurality of reference pictures 120, 130, and 140.

Referring to FIG. 1, the plurality of reference pictures 120, 130, and 140 are referred to predict the blocks 112, 114, and 116 included in the current picture 110 (P(n)). The reference picture 120 (P(n−1)) is located directly before the current picture 110 and is temporally the nearest to the current picture 110. The time gaps between the current picture 110 and the reference pictures 130 (P(n−2)) and 140 (P(n−3)) are greater than the time gap between the current picture 110 and the reference picture 120 (P(n−1)), and the time gap between the current picture 110 and the reference picture 140 (P(n−3)) is greater than the time gap between the current picture 110 and the reference picture 130 (P(n−2)).

Since the plurality of reference pictures 120, 130, and 140 are searched for prediction encoding the blocks 112, 114, and 116 included in the current picture 110, reference blocks 122, 132, and 142 may be used to predict the blocks 112 114, and 116 of the current picture 110 that may respectively exist in the plurality of reference pictures 120, 130, and 140.

In FIG. 1, prediction is performed with reference to the plurality of reference pictures 120, 130, and 140 that temporally precede the current picture 110. However, when the current picture 110 is a Bi-directional predictive picture (a B picture), pictures that temporally follow the current picture 110 can be also used in the prediction of the current picture 110, in addition to the plurality of reference pictures 120, 130, and 140 that temporally precede the current picture 110.

The blocks 112, 114, 116 included in the current picture 110 are predicted and residual blocks thereof are generated. Then, the residual blocks, a motion vector, and a reference picture index of each of the blocks 112, 114, 116 are encoded, thereby encoding the blocks 112, 114, 116 included in the current picture P(n) 110. Here, the reference picture index is information for specifying which reference picture is used from among a plurality of reference pictures in inter prediction.

According to a conventional art, the encoded motion vector includes relative location differences between the blocks 112, 114, 116 included in the current picture 110 and the reference pictures 122, 132, and 142; in other words, information about motion of the blocks on a two-dimensional (2D) plane. Since the motion vector only reflects movement with respect to an x-axis and y-axis on a 2D plane, that is, a translational transform, various transforms such as an expansion/reduction and a rotation of an image object existing between the current picture 110 and the plurality of reference pictures 120, 130, and 140 cannot fully be reflected.

In addition, in encoding or decoding according to conventional prediction encoding and decoding using various transforms of an image, a large amount of bits is used to encode information about various transforms, such as the expansion/reduction and the rotation, and thus a compression ratio for image encoding decreases.

Therefore, a method and apparatus capable of efficiently prediction encoding the current picture 110 by reflecting various transforms of an image are needed.

SUMMARY OF THE INVENTION

The present invention provides a method and apparatus for encoding and decoding an image, the method and apparatus capable of prediction encoding and decoding a current picture by reflecting various transforms of an image existing between a plurality of reference pictures, and a computer readable recording medium having embodied thereon a computer program for executing the method.

According to an aspect of the present invention, there is provided a method of encoding an image, the method including: generating information about transforms between a first picture and a second picture; generating a reference picture by transforming the second picture based on the generated information about transforms; predicting a current block of a current picture based on at least one of the reference picture and the first picture; and encoding the current block based on the result of the predicting, wherein the first picture and the second picture are encoded before the current picture.

The information about transforms may include warping between the first picture and the second picture.

The warping may include at least one of translational, isotropic, affine, and perspective transforms between the first picture and the second picture.

The first picture may be temporally the nearest to the current picture.

The information about transforms may include at least one of fade in, fade out, and blurring information between the first picture and the second picture.

According to another aspect of the present invention, there is provided a method of decoding an image, the method including: generating information about transforms between a first picture and a second picture; generating a reference picture by transforming the second picture based on the generated information about transforms; predicting a current block of a current picture based on at least one of the reference picture and the first picture; and restoring the current block based on the result of the predicting, wherein the first picture and the second picture are decoded before the current.

According to another aspect of the present invention, there is provided an apparatus for encoding an image, the apparatus including: a reference picture generation unit that generates information about transforms between a first picture and a second picture, and that generates a reference picture by transforming the second picture based on the generated information about transforms; a prediction unit that predicts a current block of a current picture based on at least one of the reference picture and the first picture; and an encoding unit that encodes the current block based on the result of prediction, wherein the first picture and the second picture are encoded before the current picture.

According to another aspect of the present invention, there is provided an apparatus for decoding an image, the apparatus including: a reference picture generation unit that generates information about transforms between a first picture and a second picture, and that generates a reference picture by transforming the second picture based on the generated information about transforms; a prediction unit that predicts a current block of a current picture based on at least one of the reference picture and the first picture; and a restoration unit that restores the current block based on the result of prediction, wherein the first picture and the second picture are decoded before the current picture.

According to another aspect of the present invention, there is provided a tangible computer readable recording medium having embodied thereon a program for causing a computer to execute the methods of encoding and decoding an image described above.

BRIEF DESCRIPTION OF THE DRAWINGS

The above and other features of the present invention will become more apparent by describing in detail exemplary embodiments thereof with reference to the attached drawings in which.

DETAILED DESCRIPTION OF THE INVENTION

Hereinafter, the present invention will be described more fully with reference to the accompanying drawings, in which exemplary embodiments of the invention are shown.

Figure 2:
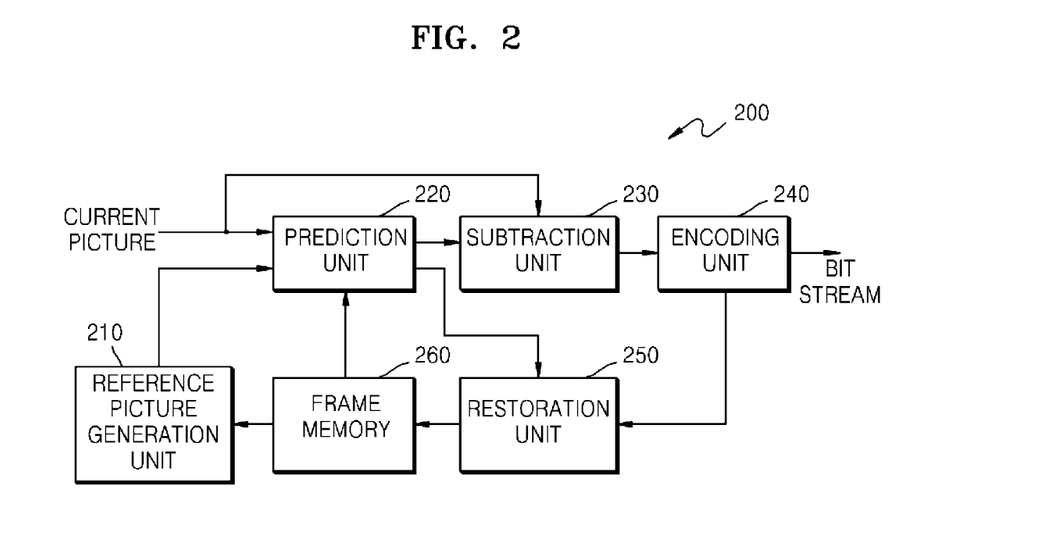
FIG. 2 is a block diagram of an apparatus for encoding an image, according to an exemplary embodiment of the present invention.

FIG. 2 is a block diagram of an apparatus 200 for encoding an image, according to an embodiment of the present invention.

Referring to FIG. 2, the apparatus 200 for encoding an image according to the current exemplary embodiment of the present invention. The apparatus 200 includes a reference picture generation unit 210, a prediction unit 220, a subtraction unit 230, an encoding unit 240, a restoration unit 250, and a frame memory 260. Here, the reference picture generation unit 210, the prediction unit 220, and the encoding unit 240 are modules relating to prediction encoding using a plurality of reference pictures according to the present invention.

The reference picture generation unit 210 generates at least one reference picture to be used in the prediction encoding of a current picture by using pictures that are encoded before the current picture and stored in the frame memory 260. This will be described in more detail with reference to FIG. 3.

Figure 3:
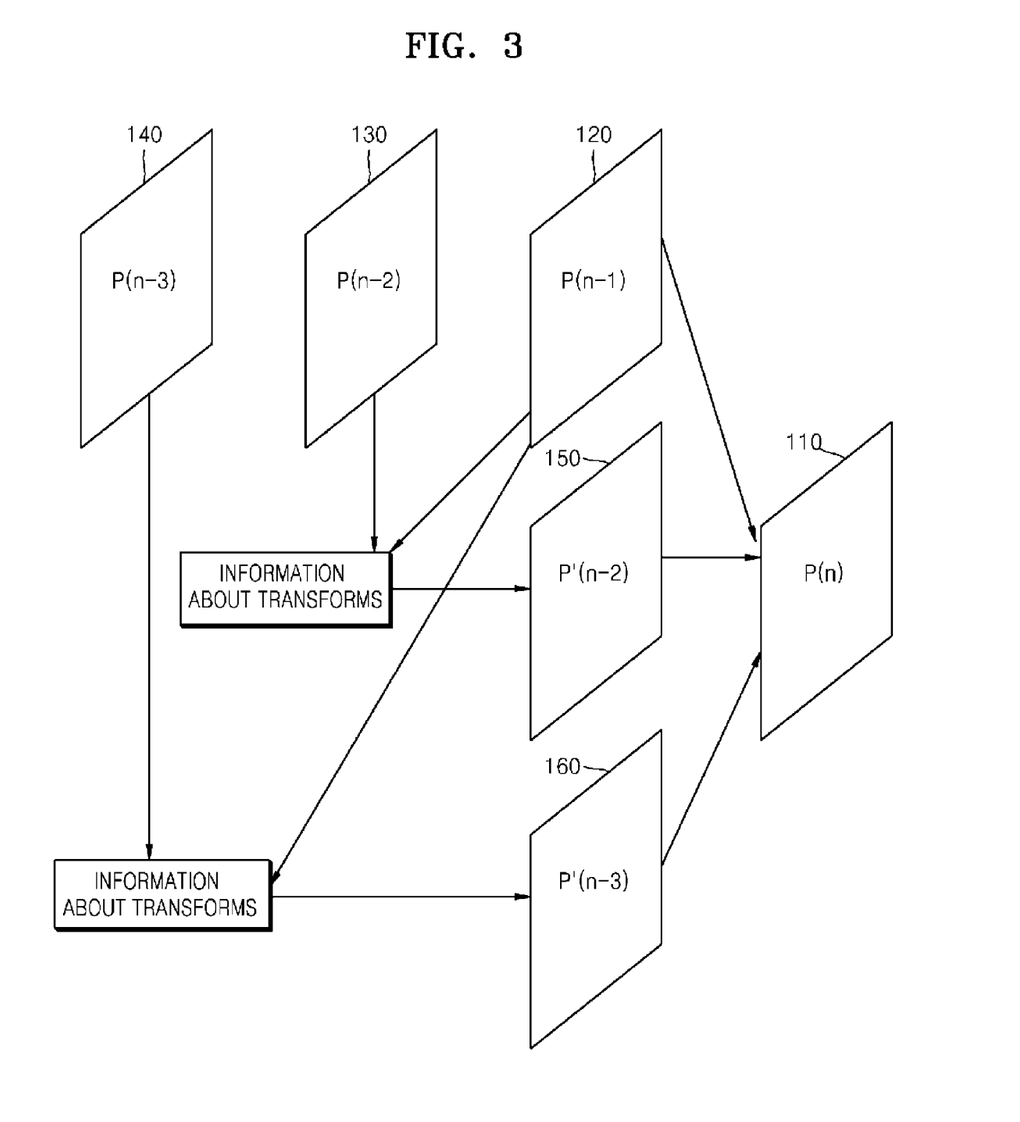
FIG. 3 is a diagram for explaining a method of predicting a current block included in a current picture, according to an exemplary embodiment of the present invention.

FIG. 3 is a diagram for explaining a method of predicting a current block included in a current picture 110, according to an exemplary embodiment of the present invention.

Referring to FIG. 3, the reference picture generation unit 210 generates new reference pictures 150 and 160 to be used in the prediction encoding of the current picture 110 by using a plurality of first, second, and third pictures 120, 130, and 140 that are encoded before the current picture 110.

If it is assumed that P(n−1) is the first picture 120 and P(n−2) is the second picture 130, the reference picture generation unit 210 generates information about transforms of an image existing between the first picture 120 and the second picture 130. There may exist various transforms, such as an istotropic, an affine, or a perspective transform, in addition to a translation transform, that can be performed on the image between the first picture 120 and the second picture 130. Such various transforms are known as warping of an image. The reference picture generation unit 210 generates information about warping between the first picture 120 and the second picture 130. Here, the first picture 120 may be temporally nearest to the current picture 110, that is the picture directly before or after the current picture 110. In addition, the first picture 120 may be the picture that is most similar to the current picture 110, in other words, the picture to which the blocks included in the current picture 110 mainly refer in inter prediction of the current picture 110.

A method of generating information about warping is now described with reference to an affine transform.

Figure 4:
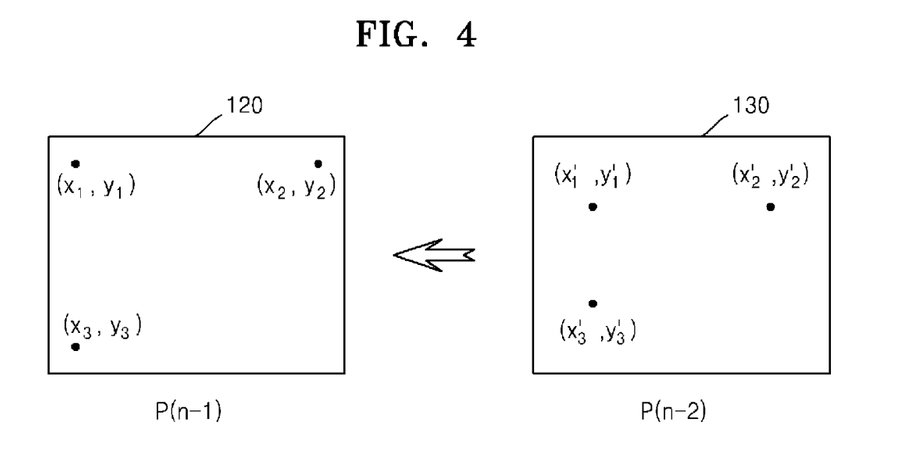
FIG. 4 is a diagram for explaining a method of generating information about transforms, according to an exemplary embodiment of the present invention.

FIG. 4 is a diagram for explaining a method of generating information about transforms, according to an exemplary embodiment of the present invention. In particular, FIG. 4 illustrates a method of obtaining parameters of the affine transform.

Referring to FIG. 4, the transforms of an image exist between the first picture 120 and the second picture 130. From among the transforms, the affine transform includes a scale transform, in addition to a translational transform. In order to parameterize the affine transform, motion of three points must be compared.

Standard points $(x_1, y_1)$, $(x_2, y_2)$, and $(x_3, y_3)$ are set in the first picture 120, and points $(x_1', y_1')$, $(x_2', y_2')$, and $(x_3', y_3')$, which respectively correspond to the standard points $(x_1, y_1)$, $(x_2, y_2)$, and $(x_3, y_3)$, are set in the second picture 130. Then, the standard points $(x_1, y_1)$, $(x_2, y_2)$, and $(x_3, y_3)$ in the first picture 120 are compared with the points $(x_1', y_1')$, $(x_2', y_2')$, and $(x_3', y_3')$ in the second picture 130, thereby obtaining parameters of the affine transform. The points $(x_1', y_1')$, $(x_2', y_2')$, and $(x_3', y_3')$ which respectively correspond to the standard points $(x_1, y_1)$, $(x_2, y_2)$, and $(x_3, y_3)$ can be obtained by comparing the block, which is included in the first picture 120 including the standard points $(x_1, y_1)$, $(x_2, y_2)$, and $(x_3, y_3)$, with the block, which is included in the second picture 130 including corresponding points $(x_1', y_1')$, $(x_2', y_2')$, and $(x_3', y_3')$. For example, since $(x_1, y_1)$, $(x_2, y_2)$, $(x_3, y_3)$, $(x_1', y_1')$, $(x_2', y_2')$, and $(x_3', y_3')$ are values which are already known, $a_{11}, a_{12}, a_{13}, a_{21}, a_{22}$, and $a_{23}$ can be obtained using six formulae and are the parameters of the affine transform, as shown below:

$$x_1 = a_{11} \times x_1' + a_{12} \times y_1' + a_{13}$$

$$y_1 = a_{21} \times x_1' + a_{12} \times y_1' + a_{23}$$

$$x_2 = a_{11} \times x_2' + a_{12} \times y_2' + a_{13}$$

$$y_2 = a_{21} \times x_2' + a_{12} \times y_2' + a_{23}$$

$$x_3 = a_{11} \times x_3' + a_{12} \times y_3' + a_{13}$$

$$y_3 = a_{21} \times x_3' + a_{12} \times y_3' + a_{23}$$

The parameters of a perspective transform calculated using four standard points included in the first picture 120 and four points, which correspond to the standard points and are included in the second picture 130, may be obtained using the determinant in the same manner as for the parameters of the affine transform.

Referring back to FIG. 3, when information about the transforms between the first picture 120 and the second picture 130 is generated, the second picture 130 is transformed based on the generated information, and thus the reference picture 150 P'(n−2) is generated. In other words, all pixels included in the second picture 130 are changed according to the parameters of the calculated affine transform to generate the reference picture 150.

When the first picture 120 is temporally the nearest picture to the current picture 110, the reference picture 150 generated by transforming the second picture 130 based on the information about the transforms between the first picture 120 and the second picture 130 may be temporally the same as the first picture 120. Accordingly, both the first and the reference pictures 120 and 150 are temporally the nearest pictures to the current picture 110, and thus have the highest probability of similarity to the current picture 110. Accordingly, when inter prediction is performed based on both the first and the reference pictures 120 and 150, the current picture 110 may be predicted more accurately.

The method of calculating information about the transforms between the first picture 120 and the second picture 130 and the method of generating the reference pictures may be applied between the first picture 120 and the third picture 140, thereby generating the other reference picture 160 (P'(n−3)). In this case, the first picture 120, the third picture 140, and the reference picture 160 may respectively become the first picture, the second picture, and the third picture. In the same way as the reference picture 150, the reference picture 160 is generated based on the information about the transforms between the first picture 120 and the third picture 140 and thus is temporally the same as the first picture 120.

Referring back to FIG. 2, the prediction unit 220 searches for the reference pictures generated in the reference picture generation unit 210 and the pictures encoded before being stored in the frame memory 260, and performs inter prediction of the current blocks included in the current picture 110. As a result of the inter prediction, a prediction block of the current block is generated. According to the exemplary embodiment illustrated in FIG. 3, at least one of the first picture 120, the reference picture 150, and the reference picture 160 is used to predict the current block of the current picture 110.

In addition to the first picture 120, the reference picture 150, and the reference picture 160, the second picture 130 and the third picture 140 may be searched for inter prediction according to conventional art. In general, since the reference pictures 150 and 160 to which the transforms of the image are reflected may have a higher probability in similarity to the current picture 110 than that of the second and third pictures 130 and 140, the reference pictures 150 and 160 are searched for to predict the current block more accurately. However, in some cases, searching for the second and third pictures 130 and 140 may be more efficient, and thus the second and third pictures 130 and 140 may also be searched for inter prediction.

In each different picture, a plurality of blocks that are similar to the blocks of the current picture is searched for, and each different weight is multiplied by the searched blocks, thereby predicting the current block. For example, when the blocks of the current picture 110 are predicted based on the first picture 120 and the reference picture 150, a highest weight is multiplied by the block that is similar to the current block and searched for in the first picture 120, and a smallest weight is multiplied by the block that is similar to the current block and searched for in the reference picture 150, thereby predicting the block of the current picture 110.

The subtraction unit 230 subtracts the current block predicted in the prediction unit 220 from an original block, thereby generating a residual block of the current block. The generated residual block is encoded in the encoding unit 240.

The encoding unit 240 discrete cosine transforms (DCT) the residual block to generate DCT coefficients, and quantizes and entropy encodes the generated DCT coefficients to generate a bit stream.

The restoration unit 250 receives the DCT coefficients quantized in the encoding unit 240 and restores the residual block.

The quantized DCT coefficients are de-quantized, and the de-quantized DCT coefficients are inverse discrete cosine transformed (IDCT), thereby restoring the residual block. The residual block is added to the prediction block generated in the prediction unit 220, and thus the current block is restored. The restored current block is stored in the frame memory 260 and is used in the prediction of a next picture or a next block.

Information needed to perform inter prediction at a decoding side, for example, a motion vector and a reference picture index, are encoded together. That is, information about the motion vector between at least one reference block searched for in the current picture 110 and the first picture 120, the reference picture 150, and the reference picture 160, and the current block, and the reference picture index indicating the picture from which the reference blocks are searched for from among the first picture 120, the reference picture 150, and the reference picture 160 are encoded together.

Here, encoding information about transforms is not needed because the reference picture generation unit 210 generates information about transforms using only the pictures that are encoded before the current block. In other words, while inter prediction is performed by reflecting transforms between the pictures, encoding information about transforms is not needed. Therefore, a more accurate inter prediction may be performed and a compression ratio for image encoding may be increased.

The above description of a warping transform is an example of a transform between the pictures encoded before the current picture, with reference to FIG. 2. However, transforms used in inter prediction are not limited thereto, and all transforms that are well known to one of ordinary skill in the art may be used in inter prediction according to the present invention. For example, information about transforms between the pictures encoded before the current picture, such as fade in, fade out, and blurring, is generated, and then one of the pictures encoded before the current picture is transformed based on the generated information, thereby generating new reference pictures. Then, the blocks of the current picture may be predicted based on the generated reference pictures. The above-mentioned fade in, fade out, and blurring are examples of transforms which can generate parameterized information by calculating transforms between the pictures, and it is obvious to one of ordinary skill in the art that inter prediction according to the present invention by using all transforms which can generate parameterized information about transforms can be performed, in addition to those transforms such as fade in, fade out, and blurring.

In addition, inter prediction according to the present invention can be used in inter prediction of a P picture, as well as a B picture. The pictures that temporally follow the current picture are transformed using information about transforms between the pictures according to the present invention and the transformed pictures can be used in inter prediction of the B picture.

Figure 5:
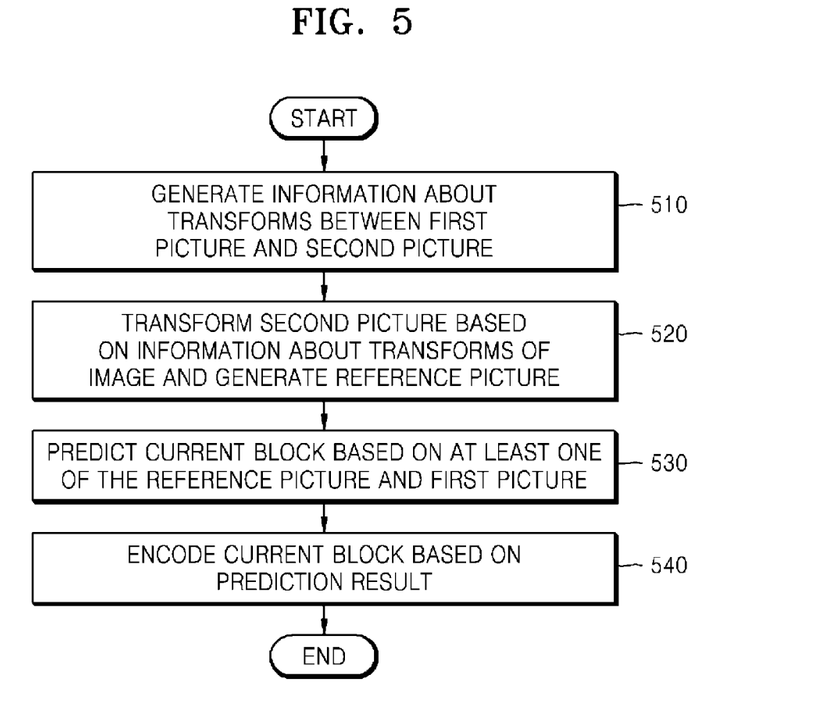
FIG. 5 is a flowchart illustrating a method of encoding an image, according to an exemplary embodiment of the present invention.

FIG. 5 is a flowchart illustrating a method of encoding an image, according to an exemplary embodiment of the present invention.

Referring to FIG. 5, in operation 510, an apparatus for encoding an image generates information about transforms of the image between a first picture and a second picture from among the pictures encoded before the current picture. Such information about transforms of the image may include warping, wherein the information about warping may include at least one of translational, isotropic, affine, and perspective transforms. Also, the first picture may be temporally nearest to the current picture, that is the picture directly before or after the current picture.

In operation 520, the apparatus for encoding an image transforms the second picture based on the information about transforms of the image generated in operation 510. A third picture, that is the transformed second picture, is generated. The transforms are reflected to the second picture and then the third picture, that is temporally the same as the first picture, is generated. Therefore, when the first picture is temporally the nearest picture to the current picture, the third picture is also temporally the nearest picture to the current picture.

In operation 530, the apparatus for encoding an image predicts a current block of the current picture based on at least one of the first picture and the third picture generated in operation 520. At least one reference block to be used in the prediction encoding of the current block is searched for from among at least one of the first picture and the third picture, and the prediction block of the current block is generated based on at least one found reference block. As described above, a plurality of reference blocks is searched for and each different weight is multiplied by the blocks found to be similar, thereby generating the prediction block of the current block.

In operation 540, the apparatus for encoding an image encodes the current block based on the prediction block generated in operation 530. The residual block is generated by subtracting the prediction block from the current block, and the residual block is discrete cosine transformed (DCT), quantized and entropy encoded, thereby generating a bit stream. The motion vector and reference picture index of the current block are also encoded. However, it is not necessary to encode information about transforms of the image between the first picture and the second picture.

Figure 6:
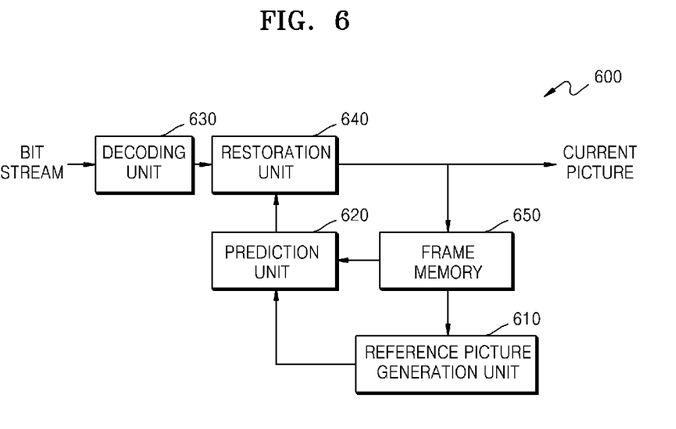
FIG. 6 is a block diagram of an apparatus for decoding an image, according to an exemplary embodiment of the present invention.

FIG. 6 is a block diagram of an apparatus 600 for decoding an image, according to an exemplary embodiment of the present invention.

Referring to FIG. 6, the apparatus 600 for decoding an image according to the current exemplary embodiment of the present invention includes a reference picture generation unit 610, a prediction unit 620, a decoding unit 630, a restoration unit 640, and a frame memory 650. Here, the reference picture generation unit 610, the prediction unit 620, and the restoration unit 640 are modules relating to prediction decoding using a plurality of reference pictures according to the present invention.

The reference picture generation unit 610 generates at least one reference picture to be used in the prediction decoding of a current picture by using pictures that are decoded before the current picture and stored in the frame memory 650. The apparatus 600 for decoding an image performs inter prediction in the same manner as the apparatus 200 for encoding an image described with reference to FIG. 2, and thus is now described with reference to FIG. 3.

In FIG. 3, if it assumed that the first picture 120, the second picture 130, and the third picture 140 are the pictures that are decoded before the current picture 110, the reference picture generation unit 610 firstly generates information about transforms of an image existing between the first, second, and third pictures 120, 130, and 140 that are previously decoded. Here, the first picture 120 is temporally the nearest to the current picture 110, or in other words, the first picture 120 may be the picture directly before the current picture 110.

Information about transforms of the image between the first picture 120 and the second picture 130 may be generated, or information about transforms of the image between the first picture 120 and the third picture 140 may be generated. As described above, the transform of an image may include an istotropic, an affine, or a perspective transform, in addition to a translation transform.

When the information about transforms of the image is generated, at least one of the second picture 130 and the third picture 140 is transformed and thus at least one of the new reference pictures 150 and 160 is generated, respectively.

The prediction unit 620 searches for at least one picture stored in the frame memory 650 that is previously decoded and at least one reference picture generated in the reference picture generation unit 610, thereby generating the prediction block of the current block.

The decoding unit 630 decodes a bit stream and generates data for the current block. Data for a residual block included in the bit stream is entropy decoded, de-quantized, and inverse discrete cosine transformed (IDCT), thereby generating the residual block. Motion vector and the reference picture index of the current block are also decoded. However, as described above, it is not necessary to decode information about transforms between the image.

The restoration unit 640 adds the prediction block of the current block generated in the prediction unit 620 to the residual block of the current block generated in the decoding unit 630, thereby restoring the current block. The restored current block is stored in the frame memory 650 and is used in the prediction decoding of the next block or the next picture.

As described above with reference to the apparatus for encoding an image 200, transforms between the pictures decoded before the current picture that are used in inter prediction are not limited thereto, and various transforms that are well known to one of ordinary skill in the art can be used in inter prediction according to the present invention. For example, information about transforms between the pictures decoded before the current picture, such as fade in, fade out, and blurring, is generated, and then one of the pictures encoded before the current picture is transformed based on the generated information, thereby generating new reference pictures. Then, the blocks of the current picture may be predicted based on the generated reference pictures. The above-mentioned fade in, fade out, and blurring are examples of transforms which can generate parameterized information about transforms and inter prediction according to the present invention can be performed using all other transforms which generate parameterized information about transforms, in addition to the above-mentioned examples of transforms.

Figure 7:
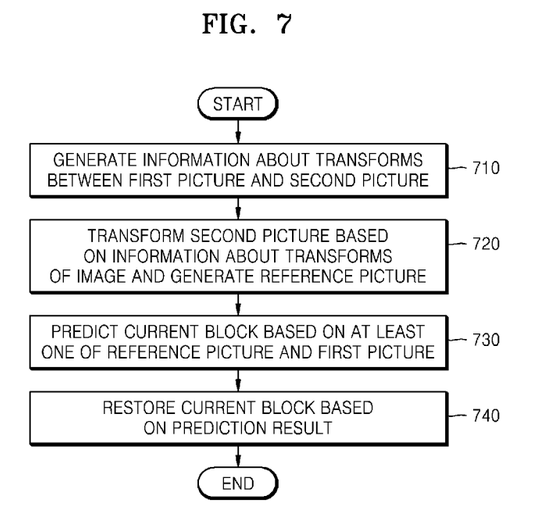
FIG. 7 is a flowchart illustrating a method of decoding an image, according to an exemplary embodiment of the present invention.

FIG. 7 is a flowchart illustrating a method of decoding an image, according to an exemplary embodiment of the present invention.

Referring to FIG. 7, in operation 710, the apparatus for decoding an image generates information about transforms of the image between the first picture and the second picture that are decoded before the current picture.

In operation 720, the apparatus for decoding an image transforms the second picture based on the information about transforms of the image, which is generated in operation 710, thereby generating a reference picture. The transforms are reflected to the second picture and then the reference picture that is temporally the same as the first picture is generated.

In operation 730, the apparatus for decoding an image predicts the current block based on at least one of the first picture and the reference picture generated in operation 720. At least one of the first picture and the reference picture is searched and the prediction block of the current block is generated.

In operation 740, the apparatus for decoding an image restores the current block based on the prediction result generated in operation 730. The residual block of the current block is added to the prediction block generated in operation 730, thereby restoring the current block.

According to the present invention, while information about various transforms of the image between a plurality of reference pictures is not separately encoded, images can be encoded by reflecting the transforms, so that a more accurate and efficient prediction encoding of the images is possible.

The present invention may also be embodied as computer readable codes on a computer readable recording medium. The computer readable recording medium may be any data storage device that can store data which can be thereafter read by a computer system. Examples of the computer readable recoding medium include read-only memory (ROM), random-access memory (RAM), CD-ROMs, magnetic tapes, floppy disks, optical data storage devices. In an alternate embodiment, the computer readable recording medium may be and carrier waves (such as data transmission through the Internet). The computer readable recoding medium may also be distributed over network coupled computer systems so that the computer readable code is stored and executed in a distributed fashion.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A method of encoding an image, the method comprising:
    generating information about transforms between a first picture and a second picture;
    generating a reference picture by transforming the second picture based on the generated information about transforms;
    predicting a current block of a current picture based on at least one of the reference picture and the first picture; and
    encoding the current block based on the result of the predicting,
    wherein the first picture and the second picture are encoded before the current picture,
    wherein the information about transform comprises at least one of translational, isotropic, affine, and perspective transforms between the first picture and the second picture.

2. The method of claim 1, wherein the information about transforms comprises warping between the first picture and the second picture.

3. The method of claim 1, wherein the first picture is temporally the nearest to the current picture.

4. The method of claim 1, wherein the information about transforms comprises at least one of fade in, fade out, and blurring information between the first picture and the second picture.

5. A method of decoding an image, the method comprising:
    generating information about transforms between a first picture and a second picture;
    generating a reference picture by transforming the second picture based on the generated information about transforms;
    predicting a current block of a current picture based on at least one of the reference picture and the first picture; and
    restoring the current block based on the result of the predicting,
    wherein the first picture and the second picture are decoded before the current picture,
    wherein the information about transform comprises at least one of translational, isotropic, affine, and perspective transforms between the first picture and the second picture.

6. The method of claim 5, wherein the information about transforms comprises warping between the first picture and the second picture.

7. The method of claim 5, wherein the first picture is temporally the nearest to the current picture.

8. The method of claim 5, wherein the information about transforms comprises at least one of fade in, fade out, and blurring information between the first picture and the second picture.

9. An apparatus for encoding an image, the apparatus comprising:
    a reference picture generation unit that generates information about transforms between a first picture and a second picture, and that generates a reference picture by transforming the second picture based on the generated information about transforms;
    a prediction unit that predicts a current block of a current picture based on at least one of the reference picture and the first picture; and an encoding unit that encodes the current block based on the result of prediction, wherein the first picture and the second picture are encoded before the current picture, wherein the information about transform comprises at least one of translational, isotropic, affine, and perspective transforms between the first picture and the second picture.

10. The apparatus of claim 9, wherein the information about transforms comprises warping between the first picture and the second picture.

11. The apparatus of claim 9, wherein the first picture is temporally the nearest to the current picture.

12. The apparatus of claim 9, wherein the information about transforms comprises at least one of fade in, fade out, and blurring information between the first picture and the second picture.

13. An apparatus for decoding an image, the apparatus comprising:

a reference picture generation unit that generates information about transforms between a first picture and a second picture, and that generates a reference picture by transforming the second picture based on the generated information about transforms;

a prediction unit that predicts a current block of a current picture based on at least one of the reference picture and the first picture; and a restoration unit that restores the current block based on the result of prediction, wherein the first picture and the second picture are decoded before the current picture, wherein the information about transform comprises at least one of translational, isotropic, affine, and perspective transforms between the first picture and the second picture.

14. The apparatus of claim 13, wherein the information about transforms comprises warping between the first picture and the second picture.

15. The apparatus of claim 13, wherein the first picture is temporally the nearest to the current picture.

16. The apparatus of claim 13, wherein the information about transforms comprises at least one of fade in, fade out, and blurring information between the first picture and the second picture.

17. A non-transitory computer readable recording medium having embodied thereon a program for causing a computer to execute a method of encoding an image, the method comprising:

generating information about transforms between a first picture and a second picture;

generating a reference picture by transforming the second picture based on the generated information about transforms;

predicting a current block of a current picture based on at least one of the reference picture and the first picture; and encoding the current block based on the result of the predicting, wherein the first picture and the second picture are encoded before the current picture, wherein the information about transform comprises at least one of translational, isotropic, affine, and perspective transforms between the first picture and the second picture.

18. A non-transitory computer readable recording medium having embodied thereon a program for causing a computer to execute a method of decoding an image, the method comprising:

generating information about transforms between a first picture and a second picture;

generating a reference picture by transforming the second picture based on the generated information about transforms;

predicting a current block of a current picture based on at least one of the reference picture and the first picture; and restoring the current block based on the result of the predicting, wherein the first picture and the second picture are decoded before the current picture, wherein the information about transform comprises at least one of translational, isotropic, affine, and perspective transforms between the first picture and the second picture.

* * * * *